United States Patent
Mitchell et al.

(10) Patent No.: US 11,290,907 B1
(45) Date of Patent: Mar. 29, 2022

(54) MOBILE DEVICE TESTING BASED ON USER CLASS

(71) Applicant: T-MOBILE USA, INC., Bellevue, WA (US)

(72) Inventors: Michael Mitchell, Bellevue, WA (US); Peter Myron, Bellevue, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 44 days.

(21) Appl. No.: 17/081,581

(22) Filed: Oct. 27, 2020

(51) Int. Cl.
  *H04W 76/18* (2018.01)
  *H04W 24/10* (2009.01)
  *H04W 72/12* (2009.01)

(52) U.S. Cl.
  CPC ....... *H04W 24/10* (2013.01); *H04W 72/1247* (2013.01); *H04W 76/18* (2018.02)

(58) Field of Classification Search
  CPC .. H04W 24/10; H04W 72/1247; H04W 76/18
  See application file for complete search history.

(56) References Cited

U.S. PATENT DOCUMENTS

| 8,351,908 B2 * | 1/2013 | Bhat | H04W 24/00 455/418 |
| 2017/0366993 A1 * | 12/2017 | Bejerano | H04L 1/0029 |
| 2018/0220310 A1 * | 8/2018 | Ekambaram | H04L 43/10 |

* cited by examiner

*Primary Examiner* — Chuong A Ngo
(74) *Attorney, Agent, or Firm* — Marshall, Gerstein & Borun LLP (57) ABSTRACT

Systems and methods are provided for testing features of a mobile device application based on their likely use by various user classes or personas. Each of a plurality of mobile computing devices may be associated with respective user classes that each have a respective set of characteristics. A particular mobile computing device application may be installed on each of the plurality of mobile computing devices, and each of the mobile computing devices may attempt to execute the same feature of the application. When any of the mobile computing devices fails to execute the feature, an indication of the failure may be logged, along with an indication of the user class associated with the mobile computing device that failed to execute the feature, and an error associated with the feature for one or more user classes may be detected based on the logged indication(s).

20 Claims, 3 Drawing Sheets

FIG. 1

| User Class/Persona 202 | Use Patterns 204 | Device Characteristics/Settings 206 | Device Characteristics/Settings 208 |
|---|---|---|---|
| Persona 1 | Open application using fingerprint | Latest updated operating system version | Map application |
| Persona 2 | Open application using application password | Large font settings on | None |
| Persona 3 | Open application using device passcode | Child settings on | Social media application(s) |
| . . . | . . . | . . . | . . . |

MOBILE DEVICE TESTING BASED ON USER CLASS

FIELD OF THE DISCLOSURE

The present disclosure generally relates to mobile device application testing and, more particularly, to testing features of a mobile device application based on their likely use by various user classes or personas.

BACKGROUND

Mobile device application features can fail for any number of reasons. In some instances, a mobile device application feature may fail only in very specific scenarios, e.g., when the feature is executed on a certain type or version of mobile device, when certain settings are enabled on the mobile device, when certain other applications or features are installed or currently running on the mobile device, when a certain amount of storage space remains on the mobile device, when the battery charge level of the mobile device is at a certain level, when the network connection status of the mobile computing device is weak, when child control features are activated on the mobile device, when the feature is activated before or after another feature in a series of actions, or some combination of the foregoing. This sheer number of variations in possible use of a feature can make it difficult to identify scenario-specific errors that may cause a given mobile device application feature to fail.

SUMMARY

Ideally, to ensure that a feature of a mobile device application works properly in all scenarios, each feature of the mobile device application would be tested on all different types and versions of mobile devices, on mobile devices with different settings enabled, on mobile devices with different other applications installed or running in the background, on mobile devices with various amounts of remaining storage space, on mobile devices at high or low battery charges, on mobile devices with strong or weak network connections, on mobile devices with child controls activated, etc. Moreover, the feature would be tested for use in various sequences or orders with respect to other features, to ensure that the feature works if activated before or after another feature or another series of features (e.g., whether the feature operates in the same way if the application is opened via fingerprint compared to if the application is opened via facial recognition or password entry). However, as hardware and software become more complex, it is impractical to test every single feature of a mobile device application with every possible combination of mobile device, network, and application settings.

The present application provides systems and methods for prioritizing the testing of mobile device application features based on their likely use by various groups of users. A set of user "personas" may be created based on actual or imagined groups or classes of users, and a given feature may be tested based on how it might be actually used by each persona. That is, each persona may be associated with different use patterns, device characteristics or settings, and/or simultaneously running applications. For instance, a "gamer" persona may have the latest version of a mobile device, with a large amount of storage space, many games installed and/or running in the background, and a strong internet connection, while a "parent" persona may have child control features activated, may have a lower battery level or weaker network connection, and may have child-related applications installed and/or running in the background. There may be any number of different types of user personas, and a given feature of the mobile device application may be tested using a real or emulated mobile device operating in a manner tailored to each persona. Accordingly, errors or bugs in application features that are likely to actually affect users may be easily detected.

Moreover, features that mobile computing devices fail to execute in an initial test may be prioritized for re-testing, e.g., based on severity, based on prevalence among user classes, etc. That is, features associated with more severe failures, more urgent failures, or failures across a larger number of user classes may require more re-testing, or more urgent re-testing, than features that are associated with less severe failures, or are only associated with failures for a smaller number of user classes.

In one aspect, a computer-implemented method is provided, comprising: causing each of a plurality of mobile computing devices to attempt to execute a feature of a mobile computing device application installed on each of the plurality of mobile computing devices, wherein each of the plurality of mobile computing devices is associated with a user class having a respective set of characteristics; logging an indication of a failure to execute the feature by at least one of the plurality of mobile computing devices and an indication of the user class associated with each of the at least one of the plurality of mobile computing devices; and detecting an error associated with the feature for one or more user classes based on the indication of the failure to execute the feature by the at least one of the plurality of mobile computing devices and the indication of the user class associated with each of the at least one of the plurality of mobile computing devices.

In another aspect, a system is provided, the system comprising: one or more processors; and a non-transitory program memory communicatively coupled to the one or more processors and storing executable instructions that, when executed by the one or more processors, cause the processors to: cause each of a plurality of mobile computing devices to attempt to execute a feature of a mobile computing device application installed on each of the plurality of mobile computing devices, wherein each of the plurality of mobile computing devices is associated with a user class having a respective set of characteristics; log an indication of a failure to execute the feature by at least one of the plurality of mobile computing devices and an indication of the user class associated with each of the at least one of the plurality of mobile computing devices; and detect an error associated with the feature for one or more user classes based on the indication of the failure to execute the feature by the at least one of the plurality of mobile computing devices and the indication of the user class associated with each of the at least one of the plurality of mobile computing devices.

In still another aspect, a non-transitory computer readable storage medium storing computer-readable instructions that, when executed by one or more processors, cause the one or more processors to: cause each of a plurality of mobile computing devices to attempt to execute a feature of a mobile computing device application installed on each of the plurality of mobile computing devices, wherein each of the plurality of mobile computing devices is associated with a user class having a respective set of characteristics; log an indication of a failure to execute the feature by at least one of the plurality of mobile computing devices and an indication of the user class associated with each of the at least one of the plurality of mobile computing devices; and detect an error associated with the feature for one or more user classes based on the indication of the failure to execute the feature by the at least one of the plurality of mobile computing devices and the indication of the user class associated with each of the at least one of the plurality of mobile computing devices.

BRIEF DESCRIPTION OF THE DRAWINGS

The figures described below depict various aspects of the systems and methods disclosed herein. Advantages will become more apparent to those skilled in the art from the following description of the embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive. Further, wherever possible, the following description refers to the reference numerals included in the following figures, in which features depicted in multiple figures are designated with consistent reference numerals.

DETAILED DESCRIPTION

Figure 1:
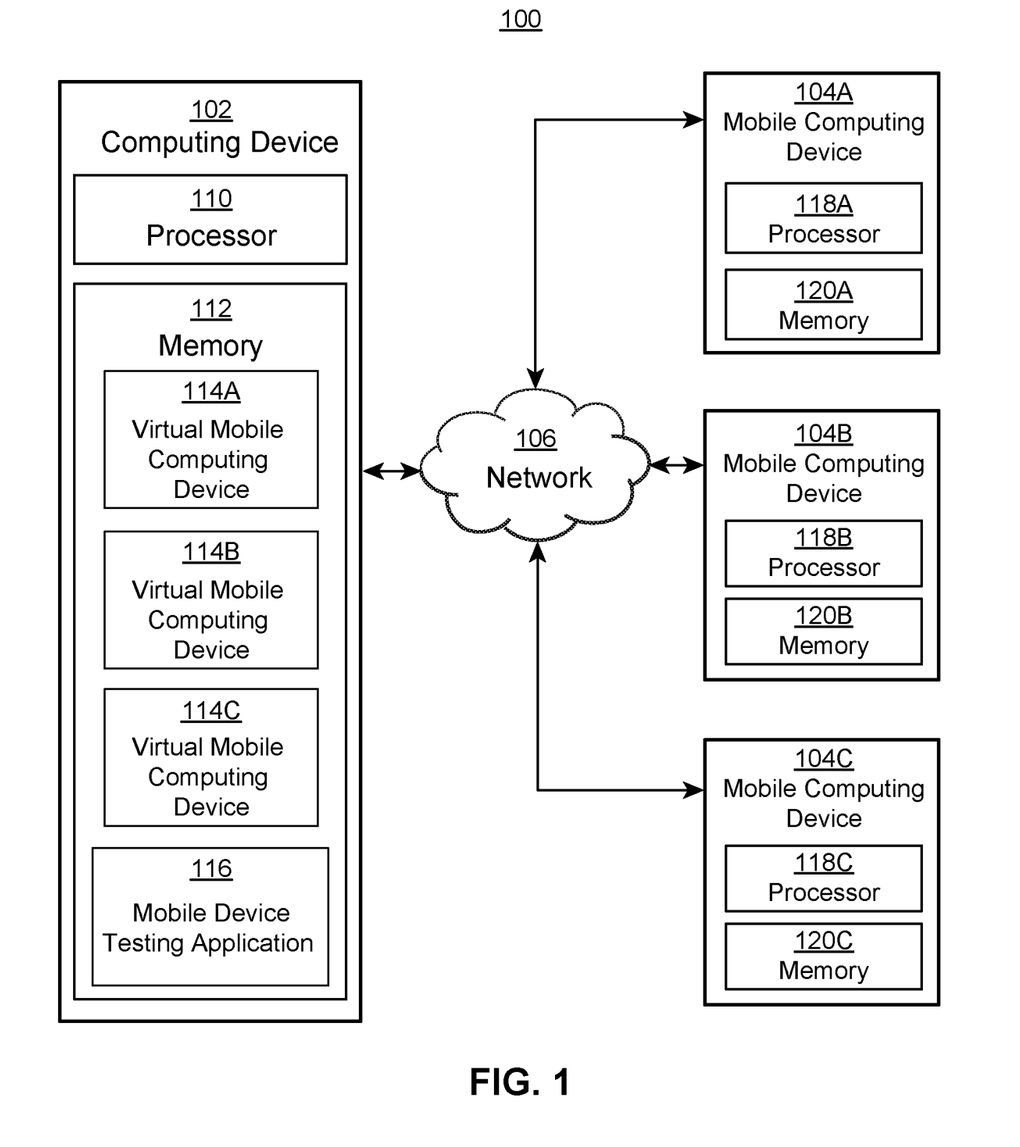
FIG. 1 illustrates a block diagram of an exemplary system for testing features of a mobile device application based on their likely use by various user classes or personas, in accordance with some embodiments.

Referring now to the drawings, FIG. 1 illustrates a block diagram of an exemplary system 100 for testing features of a mobile device application based on their likely use by various user classes or personas, in accordance with some embodiments. The high-level architecture illustrated in FIG. 1 may include both hardware and software applications, as well as various data communications channels for communicating data between the various hardware and software components, as is described below.

As shown in FIG. 1, a computing device 102 may be configured to communicate with a plurality of physical mobile computing devices 104A, 104B, 104C (which may include smart phones, smart watches, tablets, laptop computers, etc.) via a wired or wireless network 106, i.e., to send (e.g., "push") requests causing the mobile computing devices 104A-104C to attempt to execute a particular application or application feature, to receive indications of any failures by any of the mobile computing devices 104A-104C to execute the particular application or application feature, and/or to receive indications of user classes or personas associated with each of the mobile computing devices 104A-104C. Although three mobile computing devices 104A-104C are shown in FIG. 1, the computing device 102 may communicate with any number of mobile computing devices 104A-104C in various embodiments.

In particular, each of the mobile computing devices 104A-104C may be configured to have different actual or simulated settings and/or characteristics, use patterns, simultaneously running applications, etc., based on a user class or persona assigned to each of the mobile computing devices 104A-104C. In some examples, a particular mobile computing device 104A-104C may be assigned multiple user classes or personas, and may be configured to switch between operating in a manner tailored to a first user class or persona and a manner tailored to a second user class or persona, e.g., to simulate a mobile computing device 104A-104C that is used by multiple different types of users, such as a parent and a child.

For example, each of the mobile computing devices 104A-104C may have different settings enabled based on user class. For instance, mobile computing devices 104A-104C associated with a certain user class or persona may be configured to access the internet via Wi-Fi, while other of the mobile computing devices 104A-104C associated with other user classes or personas may be configured to access the internet via a mobile telecommunications network. As another example, mobile computing devices 104A-104C associated with certain user classes or personas may be configured to operate in a power-saving mode, while mobile computing devices 104A-104C that are associated with other user classes or personas may be configured to operate in a normal power use mode. As still another example, mobile computing devices 104A-104C associated with certain user classes or personas may be configured to operate their display screens with a higher screen brightness, while mobile computing devices 104A-104C associated with other user classes or personas may be configured to operate their display screens with a lower screen brightness.

As another example, mobile computing devices 104A-104C associated with different user classes or personas may be configured to have different simulated or actual network connection statuses (e.g., stronger or weaker connections to a Wi-Fi or data network). Additionally, mobile computing devices 104A-104C associated with different user classes or personas may be configured to have different simulated or actual battery charge levels (e.g., full charge, medium charge, low charge, etc.). Furthermore, mobile computing devices 104A-104C associated with different user classes or personas may be configured to have different simulated or actual remaining memory storage (e.g., memory 100% full, memory 50% full, memory 5% full, etc.). Additionally, in some examples, network connection status, battery charge level, and/or remaining memory storage may not be based on user class or persona, and may be randomly configured at varying levels for mobile computing devices 104A-104C otherwise associated with particular personas. For example, a mobile computing device 104A-104C assigned a first persona may be configured to operate using a strong internet connection in one instance and to operate using a weak internet connection in another instance.

Moreover, mobile computing devices 104A-104C associated with different user classes or personas may have different display screen sizes, display screen dimensions, or display screen resolutions. Additionally, mobile computing devices 104A-104C associated with different user classes or personas may be devices made by different manufacturers, and/or may utilize different operating systems (or different versions of the same operating systems). Furthermore, mobile computing devices 104A-104C associated with different user classes or personas may be configured with different actual or simulated user characteristics. For instance, applications installed on any of the mobile computing devices 104A-104C may, to the extent possible, be customized based on different user characteristics or demographics (e.g., age, gender, occupation, parent/child settings, account type, accessibility setting usage, etc.).

Additionally, each of the mobile computing devices 104A-104C may be configured such that any applications for which features are being tested are installed on each mobile computing device 104A-104C. Moreover, each of the mobile computing devices 104A-104 may have particular additional applications installed and/or running in the background, in addition to any applications for which features are being tested, based on the user class or persona associated with each of the mobile computing devices 104A-104C. For instance, mobile computing devices 104A-104C associated with certain user classes or personas may be configured to have no other applications installed and/or running in the background while features are being tested, while mobile computing devices 104A-104C associated with other user classes or personas may be configured to have certain numbers or types of additional applications installed and/or running in the background while features are being tested (e.g., one user class may be configured to have two additional communication applications installed and/or running in the background while features are being tested, another user class may be configured to have ten additional applications of various types installed and/or running in the background while features are being tested, etc.). Moreover, mobile computing devices 104A-104C associated with certain user classes or personas may be configured to have certain particular additional applications or certain types of other applications installed and/or running in the background while application features are being tested. For instance, mobile computing devices 104A-104C associated with certain user classes or personas may have one or more mapping or navigation applications installed and/or running in the background while features of another application are being tested. As another example, mobile computing devices 104A-104C associated with certain user classes or personas may have one or more social media applications installed and/or running in the background while features of another application are being tested.

Furthermore, mobile computing devices 104A-104C associated with different user classes or personas may be configured to operate with different simulated use patterns. For example, mobile computing devices 104A-104C associated with different user classes may be configured to open applications in a different ways (e.g., swiping on a notification associated with the application, clicking on a notification associated with the application, selecting an icon associated with the application, opening the application using a link from another application such as a web browser or email application, opening the application based on voice input, etc.), or using different security or privacy features (e.g., using a fingerprint, using facial recognition, using an application password, using a device passcode, using a stored access token, using no security/privacy features, etc.). Similarly, mobile computing devices 104A-104C associated with different user classes may be configured to trigger the execution of a feature being tested in different ways (e.g., receiving a haptic selection of an icon associated with the feature, receiving voice input associated with the feature, receiving a selection of the feature via a drop-down menu, etc.). Moreover, in some examples, mobile computing devices 104A-104C associated with different user classes may be configured to have different use patterns, security or privacy features, or ways of triggering the execution of features based on which particular application is being used (e.g., swiping on a notification associated with a first application to open it while opening a second application using an icon associated with the second application). As another example, mobile computing devices 104A-104C associated with different user classes may be configured to open an application or trigger the execution of a feature of the application in different orders with respect to other actions (e.g., before or after triggering the execution of another feature of the application, before or after triggering the execution of a feature of another application, before or after opening another application, etc.).

The computing device 102 may include one or more processors 110, such as one or more microprocessors, controllers, and/or any other suitable type of processor, and may further include a memory 112 (e.g., volatile memory, non-volatile memory) accessible by the one or more processors 110 (e.g., via a memory controller). The one or more processors 110 of the computing device 102 may interact with the memory 112 to obtain, for example, computer-readable instructions stored in the memory 112. The instructions stored in the memory 112 may include instructions for executing (i.e., emulating) a plurality of synthetic or virtual mobile computing devices 114A, 114B, 114C. Although three virtual mobile computing devices 114A-114C are shown in FIG. 1, the memory 112 of the computing device 102 (and/or other memories of other computing devices not shown) may be configured to execute any number of synthetic or virtual mobile computing devices 114A-114C. Moreover, as discussed above with respect to the physical mobile computing devices 104A-104C, each of the synthetic or virtual mobile computing devices 114A-114C may be configured to have different actual or simulated settings and/or characteristics, use patterns, additional applications running, etc., based on user classes or personas assigned to each of the mobile computing devices 114A-114C.

Moreover, the instructions stored in the memory 112 may include instructions for performing various actions related to the techniques disclosed herein, e.g., including instructions for executing a mobile device testing application 116, which may include generating a trigger or other request to execute a particular feature (e.g., of a particular mobile device application) to be sent to various physical mobile computing devices 104A-104C and/or virtual mobile computing devices 114A-114C. For instance, mobile device application features may include, e.g., navigation features causing the mobile device application to display or otherwise activate certain content in response to a selection by a user, audio or video features causing the mobile device application to display certain audio or video content in response to a selection by a user, features causing the mobile computing device application to make a certain calculation in response to a selection by a user, features causing the mobile computing device application to take photos or record video or audio in response to a selection by a user, features causing the mobile computing device application to upload or download content in response to a selection by a user, etc., or any other suitable mobile device application features.

Additionally, the instructions stored in the memory 112 may include instructions for receiving indications of failures to execute the feature by any of the physical mobile computing devices 104A-104C and/or virtual mobile computing devices 114A-114C, as well as indications of user classes or personas associated with each of the physical mobile computing devices 104A-104C and/or virtual mobile computing devices 114A-114C for which there were failures to execute the feature, instructions for logging any indications of failures to execute the feature by any of the physical mobile computing devices 104A-104C and/or virtual mobile computing devices 114A-114C, as well as indications of user classes or personas associated with each of the physical mobile computing devices 104A-104C and/or virtual mobile computing devices 114A-114C for which there were failures to execute the feature, instructions for detecting errors associated with the feature for one or more user classes or personas based on the logged indications of failures to execute the feature by any of the physical mobile computing devices 104A-104C and/or virtual mobile computing devices 114A-114C and indications of user classes or personas associated with each of the physical mobile computing devices 104A-104C and/or virtual mobile computing devices 114A-114C for which there were failures to execute the feature, instructions for generating a corrected version of the application or feature based on any detected errors, instructions for sending an updated version of the application or feature to each of the physical mobile computing devices 104A-104C and/or virtual mobile computing devices 114A-114C for which there were failures to execute the feature (or to all of the physical mobile computing devices 104A-104C and/or virtual mobile computing devices 114A-114C), etc. In particular, the computer-readable instructions stored on the memory 112 of the computing device 102 may include instructions for carrying out any of the steps of the method 300 described in greater detail below with respect to FIG. 3.

Moreover, each of the mobile computing devices 104A-104C may include respective one or more processors 118A-118C, such as one or more microprocessors, controllers, and/or any other suitable type of processor, and may further include respective memories 120A-120C (e.g., volatile memory, non-volatile memory) accessible by the one or more processors 118A-118C (e.g., via a memory controller). The respective one or more processors 118A-118C of the mobile computing devices 104A-104C may interact with the respective memories 120A-120C to obtain, for example, computer-readable instructions stored in the memories 120A-120C. The instructions stored in the memories 120A-120C may include instructions for performing various actions related to the techniques disclosed herein, e.g., instructions for running various mobile device applications, instructions for receiving requests, "pushes", or other triggers for executing a particular feature of a particular mobile device application sent by the computing device 102, and instructions for attempting to execute the particular feature of the mobile device application based on the request, push, or other trigger sent by the computing device 102. Moreover, the instructions stored in the memories 120A-120C may include instructions for determining whether the particular feature of the mobile device application was successfully executed, instructions for sending indications of whether the particular feature was successfully executed (or indications of failure to execute the particular feature) to the computing device 102, and/or instructions for sending indications of a user class associated with the mobile computing device 104A-104C to the computing device 102, etc. In particular, the computer-readable instructions stored on the respective memories 120A-120C of each of the physical mobile computing devices 104A-104C may include instructions for carrying out any of the steps of the method 300 described in greater detail below with respect to FIG. 3.

Additionally, while testing features of mobile device applications is generally discussed herein, it will be appreciated that the systems and methods disclosed herein may be applied to testing features of web applications or of websites generally in a similar manner.

Figure 2:
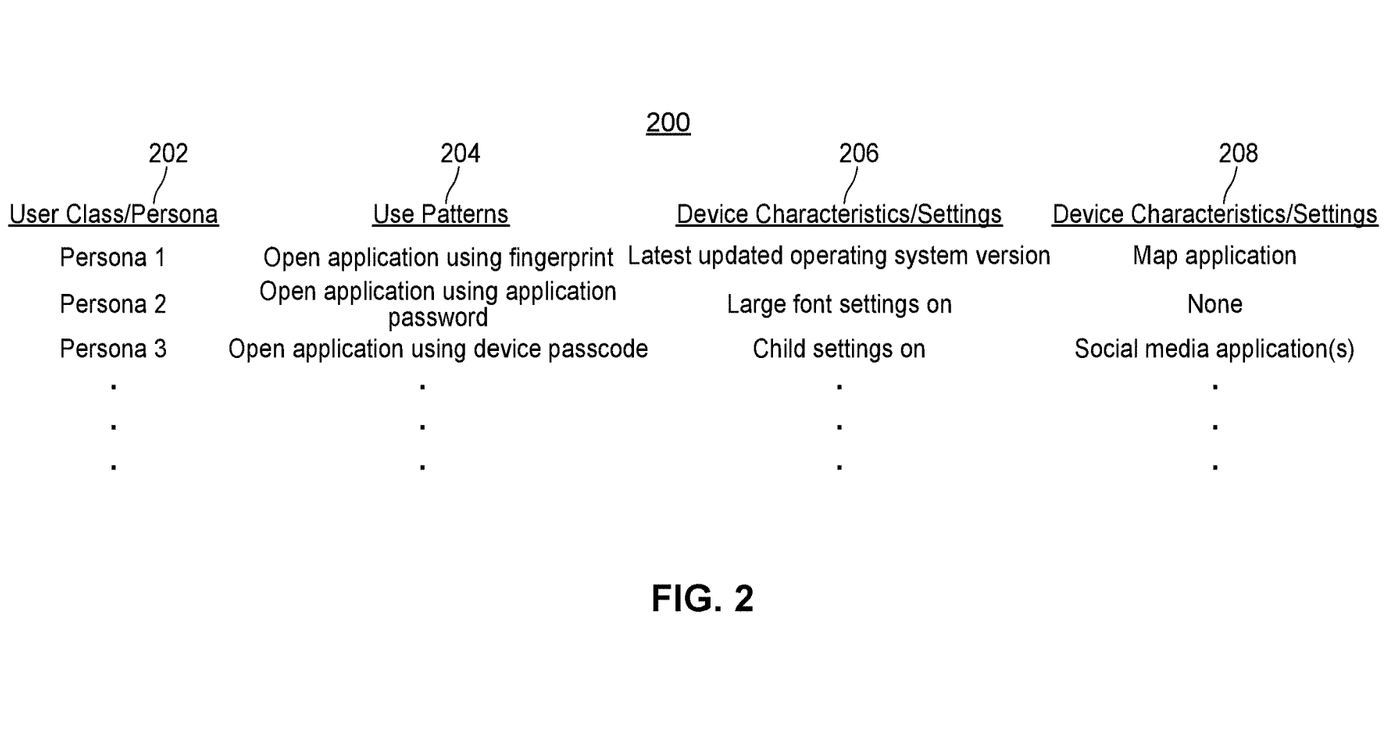
FIG. 2 illustrates an exemplary table of various example user classes or personas, and user patterns, device characteristics/settings, and simultaneously running applications associated with each of the various example user classes or personas, in accordance with some embodiments.

FIG. 2 illustrates an exemplary table 200 of various example user classes or personas 202, and user patterns 204, device characteristics/settings 206, and simultaneously running applications 208 associated with each of the various example user classes or personas, in accordance with some embodiments. Although three user classes or personas 202 are listed in the table 200, there may be any number of different user classes or personas 202 in various embodiments. Moreover, use patterns 204, device characteristics/settings 206, and simultaneously running applications 208 are not the only characteristics that may vary between user classes or personas. That is, as discussed elsewhere herein, the set of characteristics associated with each of the user classes or personas may include: location characteristics, enabled setting characteristics, use pattern characteristics, characteristics of a user of the mobile computing device, network connection status characteristics, battery power or charge characteristics, operating system characteristics, etc.

For instance, as shown in FIG. 2, each user class or persona 202 may be associated with one or more use patterns 204. For example, a first example user class or persona 202 ("Persona 1") may be associated with a use pattern 204 of opening mobile device applications from a home screen using a fingerprint. In contrast, a second example user class or persona 202 ("Persona 2") may be associated with a use pattern 204 of opening mobile device applications from a home screen using an in-application password, while a third example user class or persona 202 ("Persona 3") may be associated with a use pattern 204 of opening mobile device applications from a home screen using a device passcode. Of course, these are just a few examples of different use patterns 204 that may be associated with various user personas 202. Moreover, although just one use pattern 204 is shown as associated with each user class or persona 202 in the table 200, each user class or persona 202 may be associated with any number of use patterns 204. Additionally, multiple user classes or personas 202 may be associated with a given use pattern 204, but may be different in other ways (e.g., two user classes or personas 202 may be associated with opening applications using a fingerprint, but may be associated with different device characteristics or settings 206, different simultaneously running applications 208, etc.).

Furthermore, as shown in FIG. 2, each user class or persona 202 may be associated with one or more device characteristics or settings 206. For example, a first example user class or persona 202 ("Persona 1") may be associated with mobile computing device running the most recent updated version of a particular operating system. In contrast, a second example user class or persona 202 ("Persona 2") may be associated with a large font mobile device setting, while a third example user class or persona 202 ("Persona 3") may be associated with a mobile device using a child lock or other child-related settings. These are just a few examples of different device characteristics or settings 206 that may be associated with various user personas 202. Moreover, although just one device characteristic/setting 206 is shown as associated with each user class or persona 202 in the table 200, each user class or persona 202 may be associated with any number of device characteristics or settings 206. Additionally, multiple user classes or personas 202 may be associated with a given device characteristic/setting 206, but may be different in other ways (e.g., two user classes or personas 202 may be associated with the latest updated operating system version, but may be associated with different use patterns 204, different simultaneously running applications 208, etc.).

Additionally, as shown in FIG. 2, each user class or persona 202 may be associated with one or more simultaneously installed and/or running applications 208 (i.e., in addition to any applications with features are being tested). For example, a first example user class or persona 202 ("Persona 1") may be associated with mobile computing devices simultaneously running a map application. In contrast, a second example user class or persona 202 ("Persona 2") may be associated with mobile computing devices that are not simultaneously running any other applications, while a third example user class or persona 202 ("Persona 3") may be associated with mobile computing devices simultaneously running a social media application. These are just a few examples of different simultaneously installed and/or running applications 208 that may be associated with various user personas 202. Moreover, although just one simultaneously installed and/or running application 208 is shown as associated with each user class or persona 202 in the table 200, each user class or persona 202 may be associated with any number of simultaneously installed and/or running applications 208. Additionally, multiple user classes or personas 202 may be associated with a given simultaneously installed and/or running application 208, but may be different in other ways (e.g., two user classes or personas 202 may be associated with mobile computing devices simultaneously running a map application, but may be associated with different use patterns 204, device characteristics or settings 206, etc.).

Figure 3:
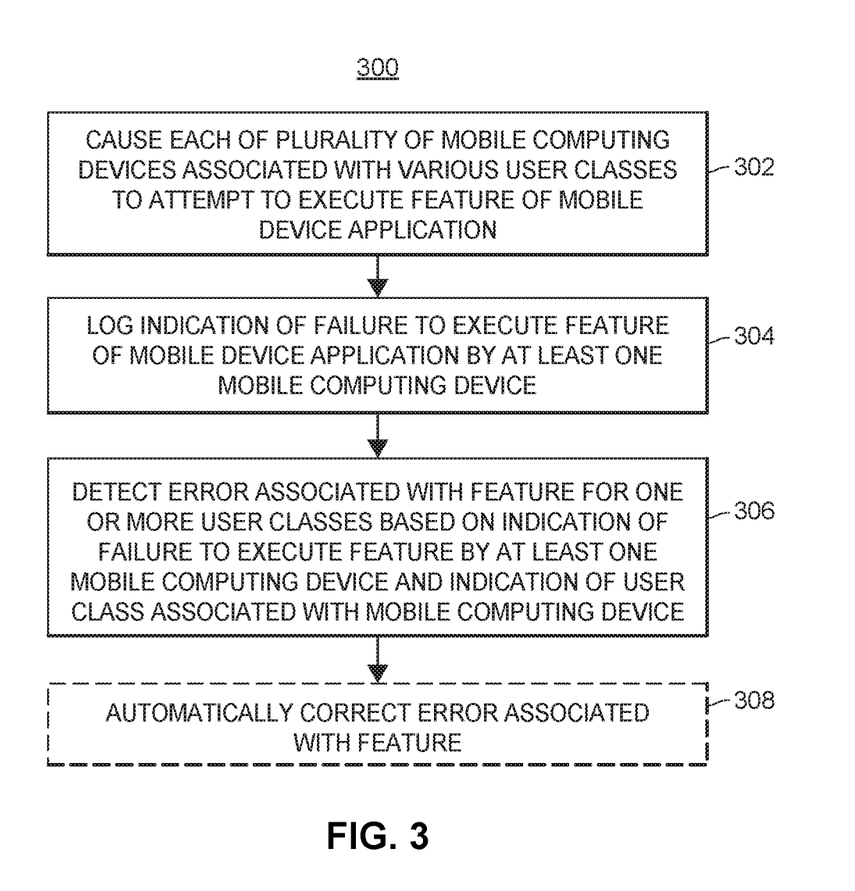
FIG. 3 illustrates a flow diagram of an exemplary method for testing features of a mobile device application based on their likely use by various user classes or personas, in accordance with some embodiments.

FIG. 3 illustrates a flow diagram of an exemplary method 300 for testing features of a mobile device application based on their likely use by various user classes or personas, in accordance with some embodiments. One or more steps of the method 300 may be implemented as a set of instructions stored on a computer-readable memory 112/120A-C and executable on one or more processors 110/118A-C.

At block 302, each of a plurality of mobile computing devices may be caused to attempt to execute a feature of a mobile computing device application installed on each of the plurality of mobile computing devices. In particular, each of the plurality of mobile computing devices may be associated with a user class having a respective set of characteristics. The set of characteristics associated with each of the user classes may include one or more of: location characteristics, enabled setting characteristics, use pattern characteristics, characteristics of a user of the mobile computing device, network connection status characteristics, battery power or charge characteristics, and/or operating system characteristics.

In some examples, one or more of the plurality of mobile computing devices may be physical mobile computing devices. Moreover, in some examples, one or more of the plurality of mobile computing devices may be synthetic mobile computing devices configured to represent physical mobile computing devices having respective characteristics, with respective synthetic mobile computing devices having characteristics corresponding to the respective characteristics of the physical mobile computing devices.

In some examples, causing the mobile computing devices to attempt to execute the feature of the mobile computing device application may include causing one or more of the mobile computing devices to attempt to execute the feature while simultaneously executing one or more other mobile computing device applications and/or other mobile computing device features. For instance, the number and/or type of other mobile computing device applications or mobile computing device features being executed simultaneously may be based on the user class associated with the mobile computing device. That is, certain user classes may be more likely to be executing a large number of mobile computing device applications simultaneously. Similarly, certain user classes may be more likely to be frequently or always executing certain mobile computing device applications (i.e., in the background) while also attempting to execute the feature being tested.

Moreover, in some examples, causing the mobile computing devices to attempt to execute the feature of the mobile computing device application may include causing each of the plurality of mobile computing devices to attempt to execute another feature of the mobile computing device application after (e.g., immediately after) the attempt to execute the feature of the mobile computing device application at block 302.

At block 304, an indication of a failure to execute the feature by at least one of the plurality of mobile computing devices may be logged, along with an indication of the user class associated with each of the mobile computing devices that failed to execute the feature. Additionally, in some examples, indications of any failures by any of the mobile computing devices to execute a second feature after attempting to execute the first feature may be logged, along with the user class associated with each mobile computing device that failed to execute the second feature after attempting to execute the first feature.

At block 306, an error associated with the feature for one or more user classes may be detected based on the indication of the failure to execute the feature by at least one of the plurality of mobile computing devices and the indication of the user class associated with each of the mobile computing devices that failed to execute the feature. Additionally, in some examples, errors associated with the second feature for one or more user classes may be detected based on the indication of the failure to execute the second feature after the first feature by at least one of the plurality of mobile computing devices and the indication of the user class associated with each of the mobile computing devices that failed to execute the second feature after the first feature.

Moreover, in some examples, features that multiple mobile computing devices fail to execute may be re-tested, e.g., based on the number of user classes for which errors are associated with the feature. That is, a feature associated with failures across a larger number of user classes may require more re-testing than a feature that is only associated with failures for a smaller number of user classes. For instance, re-testing the feature may include causing each of the plurality of mobile computing devices to attempt to execute the feature one or more additional times, based on the number of user classes for which errors are associated with the feature; and logging indications of any failures to execute the feature by any of the plurality of mobile computing devices during the one or more additional attempts, and an indication of the user class associated with each of the failures.

At block 308, in some examples, the method 300 may further include automatically correcting any detected errors associated with the feature for one or more user classes based on the indication of the failure to execute the feature by at least one of the plurality of mobile computing devices and the indication of the user class associated with each of the mobile computing devices that failed to execute the feature. For instance, a specific type of error associated with a feature being tested may be identified for each mobile computing device associated with the error, and an updated version of the application including the corrected feature may be sent (e.g., "pushed") to each of the mobile computing devices that failed to execute the feature, or to all of the mobile computing devices. Accordingly, the process may begin again at block 302, i.e., so that any errors associated with the updated version of the feature may be identified and corrected.

Although the preceding text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for the sake of clarity only so as to not confuse the reader, and it is not intended that such claim term be limited, by implication or otherwise, to that single meaning.

Throughout this specification, unless indicated otherwise, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may likewise be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Hardware modules can provide information to, and receive information from, other hardware modules. Accordingly, the described hardware modules may be regarded as being communicatively coupled. Where multiple such hardware modules exist contemporaneously, communications may be achieved through signal transmission (e.g., over appropriate circuits and buses) that connects the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, in some embodiments, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" or "in some embodiments" in various places in the specification are not necessarily all referring to the same embodiment or embodiments.

Some embodiments may be described using the terms "coupled," "connected," "communicatively connected," or "communicatively coupled," along with their derivatives. These terms may refer to a direct physical connection or to an indirect (physical or communication) connection. For example, some embodiments may be described using the term "coupled" to indicate that two or more elements are in direct physical or electrical contact. The term "coupled," however, may also mean that two or more elements are not in direct contact with each other, but yet still co-operate or interact with each other. Unless expressly stated or required by the context of their use, the embodiments are not limited to direct connection.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the words "a" or "an" are employed to describe elements and components of the embodiments herein. This is done merely for convenience and to give a general sense of the description. This description, and the claims that follow, should be read to include one or at least one, and the singular also includes the plural unless the context clearly indicates otherwise.

Upon reading this disclosure, those of skill in the art will appreciate still additional alternative structural and functional designs for testing features of a mobile device application based on their likely use by various user classes or personas. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

Finally, the patent claims at the end of this patent application are not intended to be construed under 35 U.S.C. § 112(f), unless traditional means-plus-function language is expressly recited, such as "means for" or "step for" language being explicitly recited in the claims.

What is claimed is:

1. A computer-implemented method, comprising:
causing, by one or more processors, each of a plurality of mobile computing devices to attempt to execute a feature of a mobile computing device application installed on each of the plurality of mobile computing devices, wherein each of the plurality of mobile computing devices is associated with a user class having a respective set of characteristics;
logging, by the one or more processors, an indication of a failure to execute the feature by at least one of the plurality of mobile computing devices, and an indication of the user class associated with each of the at least one of the plurality of mobile computing devices; and
detecting, by the one or more processors, an error associated with the feature for one or more user classes based on the indication of the failure to execute the feature by the at least one of the plurality of mobile computing devices and the indication of the user class associated with each of the at least one of the plurality of mobile computing devices.

2. The computer-implemented method of claim 1, wherein one or more of the plurality of mobile computing devices are synthetic mobile computing devices configured to represent physical mobile computing devices having respective characteristics, with respective synthetic mobile computing devices having characteristics corresponding to the respective characteristics of the physical mobile computing devices.

3. The computer-implemented method of claim 1, wherein one or more of the plurality of mobile computing devices are physical mobile computing devices.

4. The computer-implemented method of claim 1, wherein the set of characteristics associated with each of the plurality of the user classes includes one or more of: location characteristics, enabled setting characteristics, use pattern characteristics, characteristics of a user of the mobile computing device, network connection status characteristics, battery power or charge characteristics, or operating system characteristics.

5. The computer-implemented method of claim 1, wherein causing each of the plurality of mobile computing devices to attempt to execute the feature of the mobile computing device application includes causing one or more of the plurality of mobile computing devices to attempt to execute the feature of the mobile computing device application while executing one or more other mobile computing device applications, and wherein one or more of a number or a type of other mobile computing device applications is based on the user class associated with each respective mobile computing device.

6. The computer-implemented method of claim 1, wherein the feature is a first feature, and further comprising:
causing, by the one or more processors, each of the plurality of mobile computing devices to attempt to execute a second feature of the mobile computing device application after the attempt to execute the first feature of the mobile computing device application;
logging, by the one or more processors, an indication of a failure to execute the second feature by at least one of the plurality of mobile computing devices, and an indication of the user class associated with each of the at least one of the plurality of mobile computing devices; and
detecting, by the one or more processors, an error associated with the second feature for one or more user classes based on the indication of the failure to execute the second feature by the at least one of the plurality of mobile computing devices and the indication of the user class associated with each of the at least one of the plurality of mobile computing devices.

7. The computer-implemented method of claim 1, further comprising:
   determining, by the one or more processors, a number of user classes for which errors are associated with the feature;
   causing, by one or more processors, each of the plurality of mobile computing devices to attempt to execute the feature one or more additional times, based on the number of user classes for which errors are associated with the feature; and
   logging, by the one or more processors, an indication of any failures to execute the feature by at least one of the plurality of mobile computing devices during the one or more additional attempts, and an indication of the user class associated with each failure.

8. A system, comprising:
   one or more processors; and
   a non-transitory program memory communicatively coupled to the one or more processors and storing executable instructions that, when executed by the one or more processors, cause the processors to:
   cause each of a plurality of mobile computing devices to attempt to execute a feature of a mobile computing device application installed on each of the plurality of mobile computing devices, wherein each of the plurality of mobile computing devices is associated with a user class having a respective set of characteristics;
   log an indication of a failure to execute the feature by at least one of the plurality of mobile computing devices, and an indication of the user class associated with each of the at least one of the plurality of mobile computing devices; and
   detect an error associated with the feature for one or more user classes based on the indication of the failure to execute the feature by the at least one of the plurality of mobile computing devices and the indication of the user class associated with each of the at least one of the plurality of mobile computing devices.

9. The system of claim 8, wherein one or more of the plurality of mobile computing devices are synthetic mobile computing devices configured to represent physical mobile computing devices having respective characteristics, with respective synthetic mobile computing devices having characteristics corresponding to the respective characteristics of the physical mobile computing devices.

10. The system of claim 8, wherein one or more of the plurality of mobile computing devices are physical mobile computing devices.

11. The system of claim 8, wherein the set of characteristics associated with each of the plurality of the user classes includes one or more of: location characteristics, enabled setting characteristics, use pattern characteristics, characteristics of a user of the mobile computing device, network connection status characteristics, battery power or charge characteristics, or operating system characteristics.

12. The system of claim 8, wherein causing each of the plurality of mobile computing devices to attempt to execute the feature of the mobile computing device application includes causing one or more of the plurality of mobile computing devices to attempt to execute the feature of the mobile computing device application while executing one or more other mobile computing device applications, and wherein one or more of a number or a type of other mobile computing device applications is based on the user class associated with each respective mobile computing device.

13. The system of claim 8, wherein the feature is a first feature, and wherein the executable instructions, when executed by the one or more processors, further cause the processors to:
   cause each of the plurality of mobile computing devices to attempt to execute a second feature of the mobile computing device application after the attempt to execute the first feature of the mobile computing device application;
   log an indication of a failure to execute the second feature by at least one of the plurality of mobile computing devices, and an indication of the user class associated with each of the at least one of the plurality of mobile computing devices; and
   detect an error associated with the second feature for one or more user classes based on the indication of the failure to execute the second feature by the at least one of the plurality of mobile computing devices and the indication of the user class associated with each of the at least one of the plurality of mobile computing devices.

14. The system of claim 8, wherein the executable instructions, when executed by the one or more processors, further cause the processors to:
   determine a number of user classes for which errors are associated with the feature;
   cause each of the plurality of mobile computing devices to attempt to execute the feature one or more additional times, based on the number of user classes for which errors are associated with the feature; and
   log an indication of any failures to execute the feature by at least one of the plurality of mobile computing devices during the one or more additional attempts, and an indication of the user class associated with each failure.

15. A non-transitory computer readable storage medium storing computer-readable instructions that, when executed by one or more processors, cause the one or more processors to:
   cause each of a plurality of mobile computing devices to attempt to execute a feature of a mobile computing device application installed on each of the plurality of mobile computing devices, wherein each of the plurality of mobile computing devices is associated with a user class having a respective set of characteristics;
   log an indication of a failure to execute the feature by at least one of the plurality of mobile computing devices, and an indication of the user class associated with each of the at least one of the plurality of mobile computing devices; and
   detect an error associated with the feature for one or more user classes based on the indication of the failure to execute the feature by the at least one of the plurality of mobile computing devices and the indication of the user class associated with each of the at least one of the plurality of mobile computing devices.

16. The non-transitory computer readable storage medium of claim 15, wherein one or more of the plurality of mobile computing devices are synthetic mobile computing devices configured to represent physical mobile computing devices having respective characteristics, with respective synthetic mobile computing devices having characteristics corresponding to the respective characteristics of the physical mobile computing devices.

17. The non-transitory computer readable storage medium of claim 15, wherein one or more of the plurality of mobile computing devices are physical mobile computing devices.

18. The non-transitory computer readable storage medium of claim 15, wherein the set of characteristics associated with each of the plurality of the user classes includes one or more of: location characteristics, enabled setting characteristics, use pattern characteristics, characteristics of a user of the mobile computing device, network connection status characteristics, battery power or charge characteristics, or operating system characteristics.

19. The non-transitory computer readable storage medium of claim 15, wherein causing each of the plurality of mobile computing devices to attempt to execute the feature of the mobile computing device application includes causing one or more of the plurality of mobile computing devices to attempt to execute the feature of the mobile computing device application while executing one or more other mobile computing device applications, and wherein one or more of a number or a type of other mobile computing device applications is based on the user class associated with each respective mobile computing device.

20. The non-transitory computer readable storage medium of claim 15, wherein the feature is a first feature, and wherein the executable instructions, when executed by the one or more processors, further cause the processors to:
cause each of the plurality of mobile computing devices to attempt to execute a second feature of the mobile computing device application after the attempt to execute the first feature of the mobile computing device application;
log an indication of a failure to execute the second feature by at least one of the plurality of mobile computing devices, and an indication of the user class associated with each of the at least one of the plurality of mobile computing devices; and
detect an error associated with the second feature for one or more user classes based on the indication of the failure to execute the second feature by the at least one of the plurality of mobile computing devices and the indication of the user class associated with each of the at least one of the plurality of mobile computing devices.

\* \* \* \* \*